United States Patent
Tung

(10) Patent No.: US 10,705,518 B2
(45) Date of Patent: Jul. 7, 2020

(54) REMOTE CONTROL SYSTEM AND REMOTE CONTROL METHOD

(71) Applicant: Kinpo Electronics, Inc., New Taipei (TW)

(72) Inventor: Chi-Chang Tung, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 131 days.

(21) Appl. No.: 15/915,089

(22) Filed: Mar. 8, 2018

(65) Prior Publication Data

US 2019/0212723 A1    Jul. 11, 2019

(30) Foreign Application Priority Data

Jan. 10, 2018  (CN) .......................... 2018 1 0023295

(51) Int. Cl.
  *G05D 1/00*    (2006.01)
  *G08C 17/02*   (2006.01)
  (Continued)

(52) U.S. Cl.
  CPC ......... *G05D 1/0022* (2013.01); *G05D 1/0016* (2013.01); *G08C 17/00* (2013.01);
  (Continued)

(58) Field of Classification Search
  CPC .................................................. G05D 1/0022
  See application file for complete search history.

(56) References Cited

U.S. PATENT DOCUMENTS 10,219,975 B2 * 3/2019 Potucek ............. F04D 15/0066

2013/0051806 A1 * 2/2013 Quilici ................... H05B 47/19
  398/106
(Continued)

FOREIGN PATENT DOCUMENTS

CN    104036628    9/2014
CN    104967970    10/2015
  (Continued)

OTHER PUBLICATIONS

"Office Action of Japan Counterpart Application", dated Jul. 9, 2019, pp. 1-4.
(Continued)

*Primary Examiner* — Alex C Dunn
(74) *Attorney, Agent, or Firm* — JCIPRNET

(57) ABSTRACT

A remote control system including a remote control device and a first controllable device is provided. The remote control device has a wireless communication module, and is configured to execute a pairing connection operation. The first controllable device has a wireless communication function, and is configured to transmit first identification information. When executing the pairing connection operation, the remote control device obtains the first identification information of the first controllable device through the wireless communication module. The remote control device continuously updates and records the first identification information within a preset time range. The remote control device determines whether signal strength of the first controllable device has undergone a preset change within the preset time range based on the first identification information, and if so, the remote control device decides to connect to the first controllable device through the wireless communication module. In addition, a remote control method is provided.

15 Claims, 4 Drawing Sheets

(51) Int. Cl.
    *G08C 23/04*     (2006.01)
    *G08C 17/00*     (2006.01)
    *H04W 76/14*     (2018.01)
    *H04W 8/00*     (2009.01)

(52) U.S. Cl.
    CPC ............ *G08C 17/02* (2013.01); *G08C 23/04* (2013.01); *G08C 2201/20* (2013.01); *G08C 2201/70* (2013.01); *G08C 2201/91* (2013.01); *H04W 8/005* (2013.01); *H04W 76/14* (2018.02)

(56) References Cited

U.S. PATENT DOCUMENTS

| | | | | |
|---|---|---|---|---|
| 2013/0093962 | A1* | 4/2013 | Bruhn | G08C 23/02 348/734 |
| 2014/0270306 | A1* | 9/2014 | Luna | G01S 5/18 381/334 |
| 2014/0355389 | A1* | 12/2014 | Reunamaki | H04W 4/21 367/197 |
| 2015/0237424 | A1* | 8/2015 | Wilker | H04R 3/04 381/150 |
| 2016/0284186 | A1* | 9/2016 | Pavlich | H04W 24/04 |
| 2017/0193812 | A1* | 7/2017 | Machida | G08C 17/02 |
| 2019/0028997 | A1* | 1/2019 | Inoue | H04W 68/12 |

FOREIGN PATENT DOCUMENTS

| | | |
|---|---|---|
| CN | 104978544 | 10/2015 |
| CN | 105050029 | 11/2015 |
| CN | 105070004 | 11/2015 |
| CN | 105589345 | 5/2016 |
| EP | 2725834 | 4/2014 |
| EP | 3021565 | 5/2016 |
| EP | 3163885 | 5/2017 |
| JP | 2004328542 | 11/2004 |
| JP | 2008205780 | 9/2008 |
| JP | 2014068077 | 4/2014 |
| TW | 201703568 | 1/2017 |
| TW | 201705791 | 2/2017 |
| TW | 201709706 | 3/2017 |
| TW | 201733378 | 9/2017 |
| TW | 201931325 | 8/2019 |
| WO | 2016093768 | 6/2016 |

OTHER PUBLICATIONS

"Search Report of Europe Counterpart Application", dated Dec. 11, 2018, p. 1-p. 8.

"Office Action of Japan Counterpart Application," dated Nov. 19, 2019, p. 1-p. 4.

"Office Action of Taiwan Counterpart Application", dated Feb. 5, 2020, p. 1-p. 19.

"Office Action of China Counterpart Application", dated Jan. 21, 2020, p. 1-p. 10.

* cited by examiner

REMOTE CONTROL SYSTEM AND REMOTE CONTROL METHOD

CROSS-REFERENCE TO RELATED APPLICATION

This application claims the priority benefit of China application serial no. 201810023295.2, filed on Jan. 10, 2018. The entirety of the above-mentioned patent application is hereby incorporated by reference herein and made a part of this specification.

BACKGROUND

Technical Field

The technical field relates to a remote control technique, particularly to a remote control system and a remote control method.

Related Art

With the advances in technology, remote control techniques have more and more applications in daily life. Among them, a general remote control system, for example, includes a remote control device and a controllable device. The remote control device is, for example, a joystick, a keyboard, a button or the like; the controllable device is, for example, a toy or device such as a remote control toy car, a remote control robot, a remote control airplane or the like. Generally, when the remote control device and the controllable device are respectively turned on, the remote control device searches for the controllable device and directly connects to the controllable device. However, if a plurality of controllable devices are present within a communication range of the remote control device, the remote control device may not be able to distinguish between these controllable devices. Alternatively, the general remote control device may directly connect to the controllable device which appears first in the search result. That is, misconnection often occurs in the general remote control system. Therefore, how to design a remote control system capable of accurately pairing the remote control device with the controllable device to provide convenient pairing connection effects and further to provide good user experience is currently an important subject in this field.

SUMMARY

Embodiments of the disclosure provide a remote control system and a remote control method, in which an effective pairing function applicable between a remote control device and a controllable device can be provided.

The remote control system of the disclosure includes a remote control device and a first controllable device. The remote control device has a wireless communication module. The remote control device is configured to execute a pairing connection operation. The first controllable device has a wireless communication function, and is configured to transmit first identification information. When the remote control device executes the pairing connection operation, the remote control device obtains the first identification information of the first controllable device through the wireless communication module, and the remote control device continuously updates and records the first identification information within a preset time range. The remote control device determines whether signal strength of the first controllable device has undergone a preset change within the preset time range based on the first identification information. If the remote control device determines that the signal strength of the first controllable device has undergone the preset change, the remote control device decides to connect to the first controllable device through the wireless communication module.

The remote control method of the disclosure is adapted to a remote control system. The remote control system includes a remote control device and a first controllable device. The remote control method includes the following steps. When the remote control device executes a pairing connection operation, first identification information of the first controllable device is obtained by the remote control device through a wireless communication module, and the first identification information is continuously updated and recorded by the remote control device within a preset time range. Whether signal strength of the first controllable device has undergone a preset change within the preset time range is determined by the remote control device based on the first identification information. If the remote control device determines that the signal strength of the first controllable device has undergone the preset change, a decision is made by the remote control device to connect to the first controllable device through the wireless communication module.

Based on the above, in the remote control system and the remote control method of the disclosure, whether the signal strength of the controllable device has undergone a preset change may be determined by the remote control device, thereby deciding whether the remote control device should connect to the controllable device. Therefore, the remote control device of the disclosure can be accurately paired with a specific controllable device to provide convenient pairing connection effects.

To make the above features and advantages of the disclosure more comprehensible, several embodiments accompanied with drawings are described in detail as follows.

DETAILED DESCRIPTION OF DISCLOSED EMBODIMENTS

Figure 1:
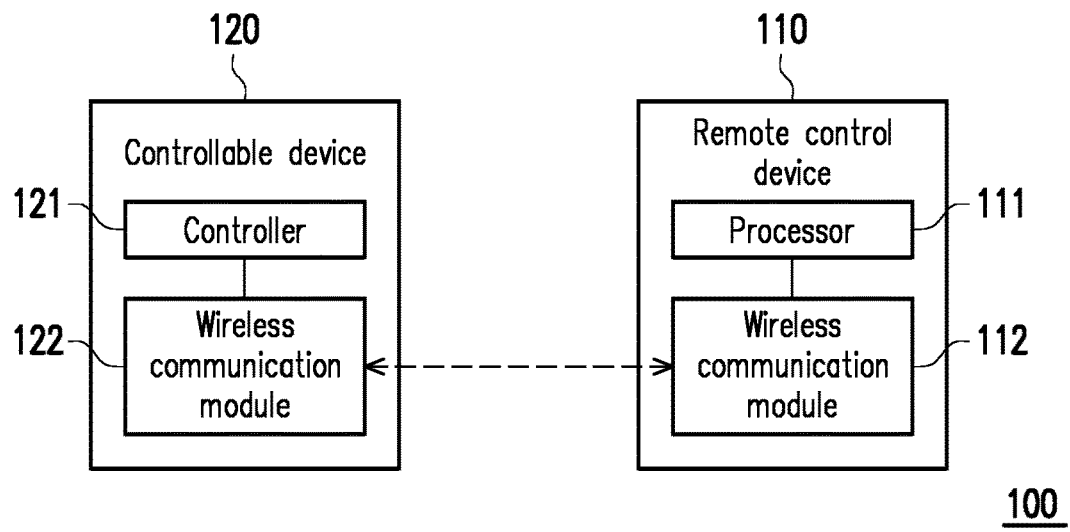
FIG. 1 illustrates a schematic diagram of a remote control system according to an embodiment of the disclosure.

In order to make the disclosure more comprehensible, several embodiments are provided below to illustrate the disclosure. However, the disclosure is not limited to the embodiments mentioned herein. In addition, the embodiments can be appropriately combined with one another. Moreover, wherever appropriate in the drawings and embodiments, elements/components/steps with the same reference numerals represent the same or similar parts.

FIG. 1 illustrates a schematic diagram of a remote control system according to an embodiment of the disclosure. Referring to FIG. 1, a remote control system 100 includes a remote control device 110 and a controllable device 120. In the present embodiment, the remote control device 110 includes a processor 111 and a wireless communication module 112. The processor 111 is coupled to the wireless communication module 112. The controllable device 120 includes a controller 121 and a wireless communication module 122. The controller 121 is coupled to the wireless communication module 122. The remote control device 110 is configured to communicate with the wireless communication module 122 of the controllable device 120 through the wireless communication module 112. In the present embodiment, the processor 111 of the remote control device 110 executes a pairing connection operation to be electrically connected to the controller 121 of the controllable device 120. When the remote control device 110 is successfully paired with the controllable device 120, the processor 111 outputs a control signal to the controllable device 120 through the wireless communication module 112. In an embodiment, the controllable device 120 is a remote control robot. The remote control device 110 may control the controllable device 120 to execute a specific operation or function.

In the present embodiment, the processor 111 and the controller 121 are each, for example, a central processing unit (CPU), a system on chip (SOC), or a programmable general purpose or special purpose microprocessor, a digital signal processor (DSP), a programmable controller, an application specific integrated circuit (ASIC), a programmable logic device (PLD), other similar processing device or a combination of the foregoing devices.

In the present embodiment, the wireless communication modules 112 and 122 are Bluetooth modules, thus providing the remote control device 110 and the controllable device 120 with a Bluetooth communication function. Moreover, the "pairing connection operation" as mentioned in the embodiments of the disclosure refers to a Bluetooth pairing operation. In the present embodiment, the wireless communication module 112 of the remote control device 110 is, for example, a Bluetooth master module. The wireless communication module 122 of the controllable device 120 is, for example, a Bluetooth slave module. However, in an embodiment, the wireless communication modules 112 and 122 may be, for example, Wi-Fi modules, Global System for Mobile Communications (GSM) modules, code-division multiple access (CDMA) modules, time-division multiple access (TDMA) modules, Worldwide Interoperability for Microwave Access (WiMAX) modules, Long-Term Evolution (LTE) modules, wireless local area network (WLAN) modules or ultra-wideband (UWB) modules, and so on. In other embodiments of the disclosure, the wireless communication modules 112 and 122 may be integrated into the processor 111 or the controller 121.

In an embodiment, the remote control device 110 may further include an input unit, an energy storage unit and an antenna unit. The processor 111 is coupled to the input unit and the energy storage unit. The input unit is, for example but not limited to, a joystick, a switch, a button, a touch element or the like. In an embodiment, the controllable device 120 may further include an element of a remote control robot, such as a driving unit, a motor unit, an energy storage unit, a robot mechanism and so on. The controller 121 is coupled to the driving unit, the motor unit, the energy storage unit and the robot mechanism. For example, a user may provide an input signal to the processor 111 through the input unit, so that the processor 111 generates a corresponding control signal to the wireless communication module 112. The wireless communication module 112 emits the control signal through the antenna unit. Thus, after the remote control device 110 is paired with the controllable device 120, the controllable device 120 receives the control signal provided by the remote control device 110. Based on the control signal, the controllable device 120 drives the motor unit and the robot mechanism by the driving unit to execute related specific work, operations and so on. The disclosure is not limited thereto.

In the present embodiment, the processor 111 of the remote control device 110 is configured to execute the pairing connection operation to decide whether to connect to the controllable device 120. In the present embodiment, the remote control device 110 obtains identification information of the controllable device 120 through the wireless communication module 112, and the remote control device 110 continuously updates and records the identification information of the controllable device 120 within a preset time range. In the present embodiment, the identification information includes a received signal strength indicator (RSSI) and a unique identifier (UID). In the present embodiment, the remote control device 110 determines whether signal strength of the controllable device 120 has undergone a preset change based on the identification information. If the remote control device 110 determines that the signal strength of the controllable device 120 has undergone the preset change, the remote control device 110 connects to the controllable device 120 through the wireless communication module 112.

Specifically, in the present embodiment, the above-mentioned preset change may refer to whether the signal strength of the controllable device 120 has been in a continuously changing state within the preset time range. That is, the remote control device 110 determines whether the signal strength of the controllable device 120 has been in the continuously changing state within the preset time range based on a signal strength indicator in the identification information, so as to connect to the controllable device 120 through the wireless communication module 112. Under a condition that signals emitted by the controllable device 120 through the wireless communication module 122 have fixed signal strength, if the signal strength indicator received by the remote control device 110 exhibits a strength change, it means that the device body of the controllable device 120 has been continuously displaced. For example, after turning on the remote control device 110 and the controllable device 120, the user needs to wave or shake the controllable device 120 left and right to cause the remote control device 110 to determine that the signal strength of the controllable device 120 has been in the continuously changing state within the preset time range. Accordingly, the remote control device 110 is paired with and connects to the controllable device 120.

Figure 2:
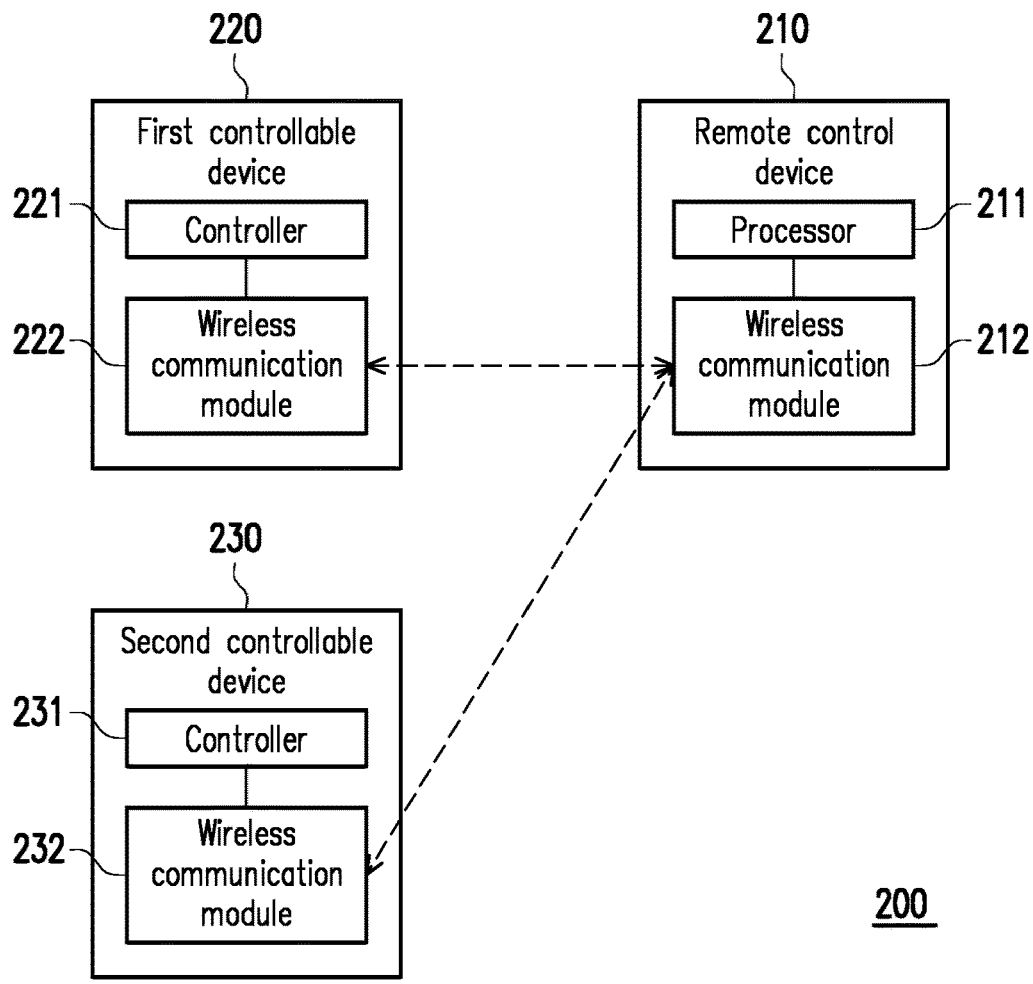
FIG. 2 illustrates a schematic diagram of a remote control system according to another embodiment of the disclosure.

FIG. 2 illustrates a schematic diagram of a remote control system according to another embodiment of the disclosure. Referring to FIG. 2, a remote control system 200 includes a remote control device 210, a first controllable device 220 and a second controllable device 230. In the present embodiment, the remote control device 210 includes a processor 211 and a wireless communication module 212. The processor 211 is coupled to the wireless communication module 212. The first controllable device 220 includes a controller 221 and a wireless communication module 222. The controller 221 is coupled to the wireless communication module 222. The second controllable device 230 includes a controller 231 and a wireless communication module 232. The controller 231 is coupled to the wireless communication module 232. The remote control device 210 is configured to communicate with the wireless communication modules 222 and 232 of the first controllable device 220 and the second controllable device 230 through the wireless communication module 212. In the present embodiment, the processor 211 of the remote control device 210 executes the pairing connection operation to select one of the wireless communication modules 222 and 232 for the pairing.

In the present embodiment, the processor 211 of the remote control device 210 is configured to execute the pairing connection operation so as to decide to select one of the first controllable device 220 and the second controllable device 230 for the connection. In the present embodiment, the remote control device 210 obtains identification information of each of the first controllable device 220 and the second controllable device 230 through the wireless communication module 212, and the remote control device 210 continuously updates and records the identification information of each of the first controllable device 220 and the second controllable device 230 within a preset time range. In the present embodiment, the identification information of each of the first controllable device 220 and the second controllable device 230 includes an RSSI and a UID. In the present embodiment, the remote control device 210 determines whether signal strength of each of the first controllable device 220 and the second controllable device 230 has undergone a preset change based on the identification information of each of the first controllable device 220 and the second controllable device 230. The remote control device 210 connects to one of the first controllable device 220 and the second controllable device 230 which satisfies the preset change, through the wireless communication module 212.

Figure 3:
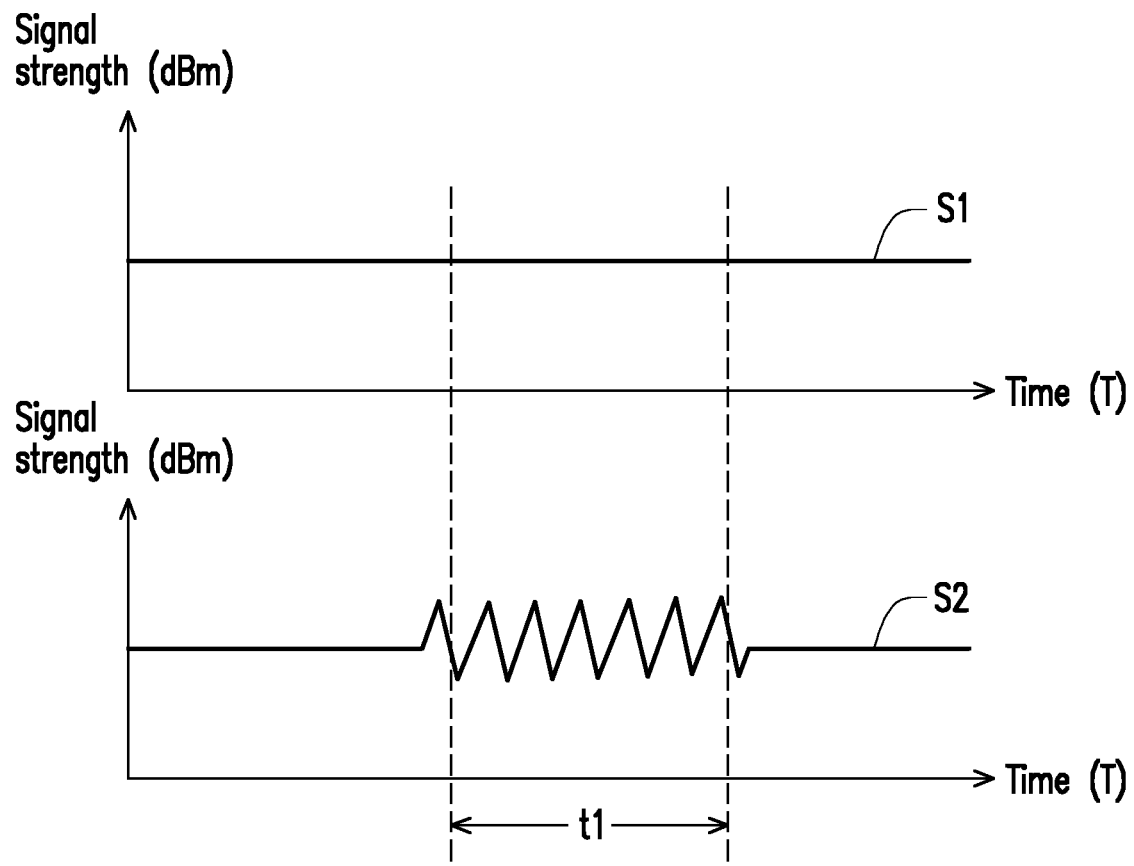
FIG. 3 illustrates a schematic diagram of signal strength according to an embodiment of the disclosure.

FIG. 3 illustrates a schematic diagram of signal strength according to an embodiment of the disclosure. Referring to FIG. 2 and FIG. 3, in the present embodiment, the above-mentioned preset change may refer to the following: based on the identification information of each of the first controllable device 220 and the second controllable device 230, the remote control device 210 determines whether signal strength S1 and signal strength S2 of the first controllable device 220 and the second controllable device 230 respectively have been in a continuously changing state within a preset time range t1, so as to select one of the first controllable device 220 and the second controllable device 230. In the present embodiment, the processor 211 analyzes the identification information of each of the first controllable device 220 and the second controllable device 230 to obtain a signal strength change as shown in, for example, FIG. 3. In the present embodiment, a signal emitted by the wireless communication module 222 of the first controllable device 220 has the signal strength S1 which does not change with time. A signal emitted by the wireless communication module 232 of the second controllable device 230 has the signal strength S2 which changes with time within the preset time range t1.

Specifically, in the present embodiment, based on a signal strength indicator in the identification information of each of the first controllable device 220 and the second controllable device 230, the remote control device 210 determines whether the signal strength S1 and the signal strength S2 of the first controllable device 220 and the second controllable device 230 respectively have been in a continuously changing state within the preset time range t1, so as to connect to one of the first controllable device 220 and the second controllable device 230 through the wireless communication module 212. Under a condition that signals emitted by the first controllable device 220 and the second controllable device 230 respectively through the wireless communication modules 222 and 232 have fixed signal power, if one of the signal strength S1 and the signal strength S2 respectively corresponding to the signal strength indicators of the first controllable device 220 and the second controllable device 230 that are received by the remote control device 210 exhibits a strength change, it means that the device body of one of the first controllable device 220 and the second controllable device 230 has been continuously displaced.

For example, after turning on the remote control device 210, the first controllable device 220 and the second controllable device 230, the user needs to wave or shake the device body of the second controllable device 230 left and right to cause the remote control device 210 to determine that the signal strength S2 of the second controllable device 230 has been in the continuously changing state within the preset time range t1. The device body of the first controllable device 220 is in a still state. Accordingly, the remote control device 210 is paired with and connects to the second controllable device 230. That is, no matter which one of the first controllable device 220 and the second controllable device 230 is turned on first, or no matter which one of the first controllable device 220 and the second controllable device 230 first communicates with the remote control device 210, the remote control device 210 of the present embodiment will only be paired with the second controllable device 230 that first has undergone continuous displacement. In the present embodiment, the preset time range t1 is, for example but not limited to, 50 milliseconds (ms), 200 ins, 500 ms or the like. In the present embodiment, a starting point of the preset time range t1 may be when the remote control device 210 is activated. However, the disclosure is not limited thereto. Moreover, in an embodiment, the remote control device 210 may further set upper and lower threshold values of the signal strength change, so that whether one of the signal strength S1 and the signal strength S2 of the first controllable device 220 and the second controllable device 230 has undergone a change can be determined with the assistance of the upper and lower threshold values of the signal strength change.

Figure 4:
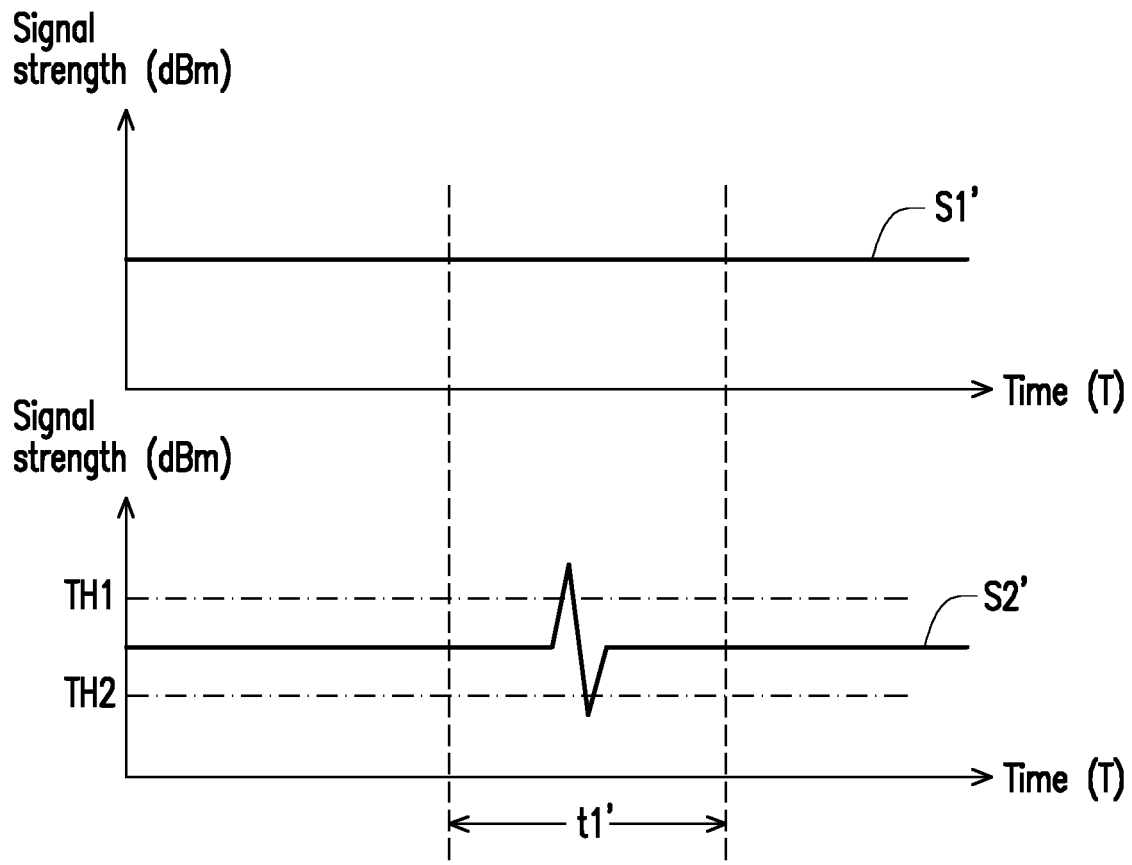
FIG. 4 illustrates a schematic diagram of signal strength according to another embodiment of the disclosure.

FIG. 4 illustrates a schematic diagram of signal strength according to another embodiment of the disclosure. Referring to FIG. 2 and FIG. 4, in the present embodiment, the above-mentioned preset change may refer to the following: based on the identification information of each of the first controllable device 220 and the second controllable device 230, the remote control device 210 determines whether signal strength S1' and signal strength S2' of the first controllable device 220 and the second controllable device 230 respectively has undergone a notable change within a preset time range tr, so as to select one of the first controllable device 220 and the second controllable device 230. In the present embodiment, the processor 211 analyzes the identification information of each of the first controllable device 220 and the second controllable device 230 to obtain a signal strength change as shown in, for example, FIG. 4. In the present embodiment, a signal emitted by the wireless communication module 222 of the first controllable device 220 has the signal strength S1' which does not change with time. A signal emitted by the wireless communication module 232 of the second controllable device 230 has the signal strength S2' which undergoes a notable change within the preset time range t1'.

Specifically, in the present embodiment, based on the signal strength indicator in the identification information of each of the first controllable device 220 and the second controllable device 230, the remote control device 210 determines whether the signal strength S1' and the signal strength S2' of the first controllable device 220 and the second controllable device 230 respectively have changed to become at least one of higher than a first threshold value TH1 and lower than a second threshold value TH2 within the preset time range t1', so as to connect to one of the first controllable device 220 and the second controllable device 230 through the wireless communication module 212. Under a condition that signals emitted by the first controllable device 220 and the second controllable device 230 respectively through the wireless communication modules 222 and 232 have fixed signal power, if one of the signal strength S1' and the signal strength S2' respectively corresponding to the signal strength indicators of the first controllable device 220 and the second controllable device 230 that are received by the remote control device 210 exhibits a drastic strength change, it means that the device body of one of the first controllable device 220 and the second controllable device 230 has been displaced.

For example, after turning on the remote control device 210, the first controllable device 220 and the second controllable device 230, the user needs to wave or shake the device body of the second controllable device 230 left and right once to cause the remote control device 210 to determine that the signal strength S2' of the second controllable device 230 has undergone a drastic change within the preset time range t1'. The device body of the first controllable device 220 is in a still state. Accordingly, the remote control device 210 is paired with and connects to the second controllable device 230. That is, no matter which one of the first controllable device 220 and the second controllable device 230 is turned on first, or no matter which one of the first controllable device 220 and the second controllable device 230 first communicates with the remote control device 210, the remote control device 210 of the present embodiment will only be paired with the second controllable device 230 that first has undergone notable displacement. In the present embodiment, the preset time range t1' is, for example but not limited to, 50 ms, 200 ins, 500 ms or the like. In the present embodiment, a starting point of the preset time range t1' may be when the remote control device 210 is activated. However, the disclosure is not limited thereto.

However, in another embodiment, the conditions of the embodiment of FIG. 3 may be combined with the conditions of the embodiment of FIG. 4. That is, the remote control device 210 not only determines whether the signal strength S1' and the signal strength S2' of the first controllable device 220 and the second controllable device 230 respectively have been continuously changing within the preset time range t1, but also determines whether the signal strength change has satisfied the condition of at least one of higher than the first threshold value TH1 and lower than the second threshold value TH2.

Figure 5:
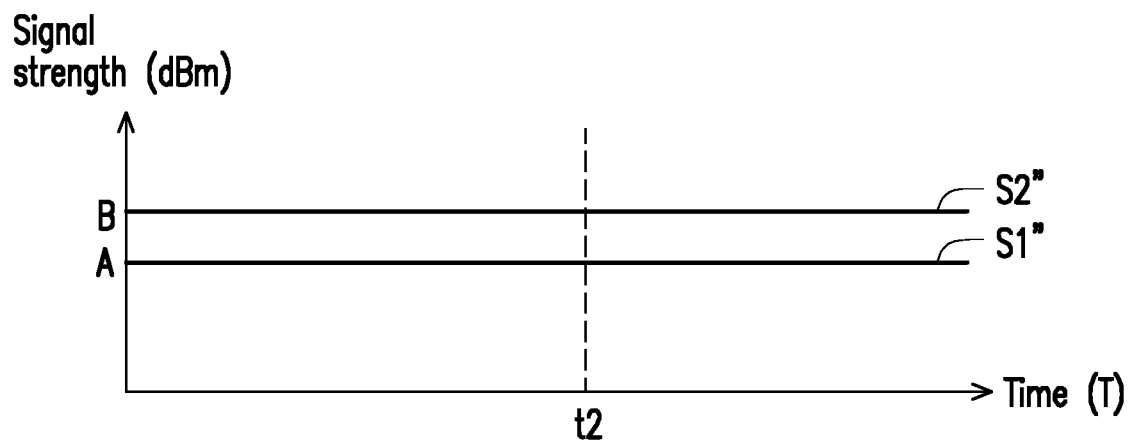
FIG. 5 illustrates a schematic diagram of signal strength according to still another embodiment of the disclosure.

FIG. 5 illustrates a schematic diagram of signal strength according to still another embodiment of the disclosure. Referring to FIG. 2 and FIG. 5, in the present embodiment, the above-mentioned preset change may refer to the following: based on the identification information of each of the first controllable device 220 and the second controllable device 230, the remote control device 210 determines a distance between each of the first controllable device 220 and the second controllable device 230 and the remote control device 210 at a time point t2, so as to select one of the first controllable device 220 and the second controllable device 230 which is farther or nearer. In the present embodiment, the processor 211 analyzes the identification information of each of the first controllable device 220 and the second controllable device 230 to obtain a signal strength change as shown in, for example, FIG. 5. In the present embodiment, a signal emitted by the wireless communication module 222 of the first controllable device 220 has a signal strength S1". A signal emitted by the wireless communication module 232 of the second controllable device 230 has a signal strength S2".

Specifically, in the present embodiment, based on the signal strength indicator in the identification information of each of the first controllable device 220 and the second controllable device 230, the remote control device 210 determines different distances respectively corresponding to signal strength values A and B of the signal strength S1" and the signal strength S2" of the first controllable device 220 and the second controllable device 230 respectively at the preset time point t2, so as to connect to one of the first controllable device 220 and the second controllable device 230 through the wireless communication module 212. Under a condition that signals emitted by the first controllable device 220 and the second controllable device 230 respectively through the wireless communication modules 222 and 232 have fixed signal power, if the signal strength indicators of the first controllable device 220 and the second controllable device 230 that are received by the remote control device 210 respectively correspond to different distances, it means that the device bodies of the first controllable device 220 and the second controllable device 230 are respectively at different distances from the remote control device 210.

For example, after the user turns on the remote control device 210, the first controllable device 220 and the second controllable device 230, although the device bodies of the first controllable device 220 and the second controllable device 230 are both in a still state, the second controllable device 230 has greater signal strength so that the signal strength value B of the second controllable device 230 is greater than the signal strength value A of the first controllable device 220. Accordingly, the remote control device 210 chooses to be paired with and connect to the second controllable device 230. That is, no matter which one of the first controllable device 220 and the second controllable device 230 is turned on first, or no matter which one of the first controllable device 220 and the second controllable device 230 first communicates with the remote control device 210, the remote control device 210 of the present embodiment will be paired with the second controllable device 230 that is nearer to the remote control device 210. In the present embodiment, a starting point of the preset time point t2 may be when the remote control device 210 is activated. However, the disclosure is not limited thereto. Moreover, in an embodiment, the remote control device 210 may further set a threshold value of the signal strength change, so as to accordingly determine whether one of the signal strength S1" of the first controllable device 220 and the signal strength S2" of the second controllable device 230 has exceeded the threshold value. The remote control device 210 may select one of the first controllable device 220 and the second controllable device 230 whose signal strength has exceeded the threshold value for the connection.

Figure 6:
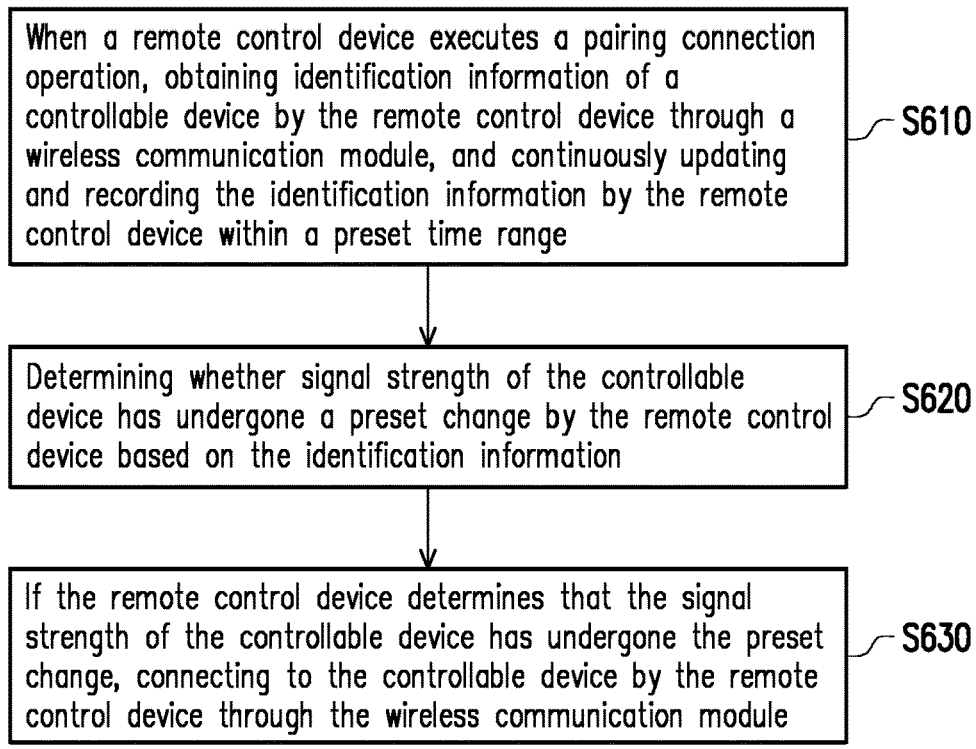
FIG. 6 illustrates a schematic diagram of a remote control method according to an embodiment of the disclosure.

FIG. 6 illustrates a schematic diagram of a remote control method according to an embodiment of the disclosure. Referring to FIG. 1 and FIG. 6, the remote control method of the present embodiment is at least applicable to the remote control system 100 of the embodiment of FIG. 1. In the present embodiment, the remote control system 100 includes the remote control device 110 and the controllable device 120. In step S610, when the remote control device 110 executes the pairing connection operation, the remote control device 110 obtains the identification information of the controllable device 120 through the wireless communication module 112, and the remote control device 110 continuously updates and records the identification information within the preset time range. In step S620, the remote control device 110 determines whether the signal strength of the controllable device 120 has undergone the preset change based on the identification information. In step S630, if the remote control device 110 determines that the signal strength of the controllable device 120 has undergone the preset change, the remote control device 110 connects to the controllable device 120 through the wireless communication module 112. Therefore, the remote control device 110 of the present embodiment may be paired with the controllable device 120 based on a determination result of the signal strength of the controllable device 120.

In addition, sufficient teaching, suggestions and descriptions for implementation regarding other device features and implementation manners of the remote control device 110 and the controllable device 120 of the present embodiment may be obtained from the embodiments of FIG. 1 to FIG. 5, and thus, details thereof are not repeated hereinafter.

Figure 7:
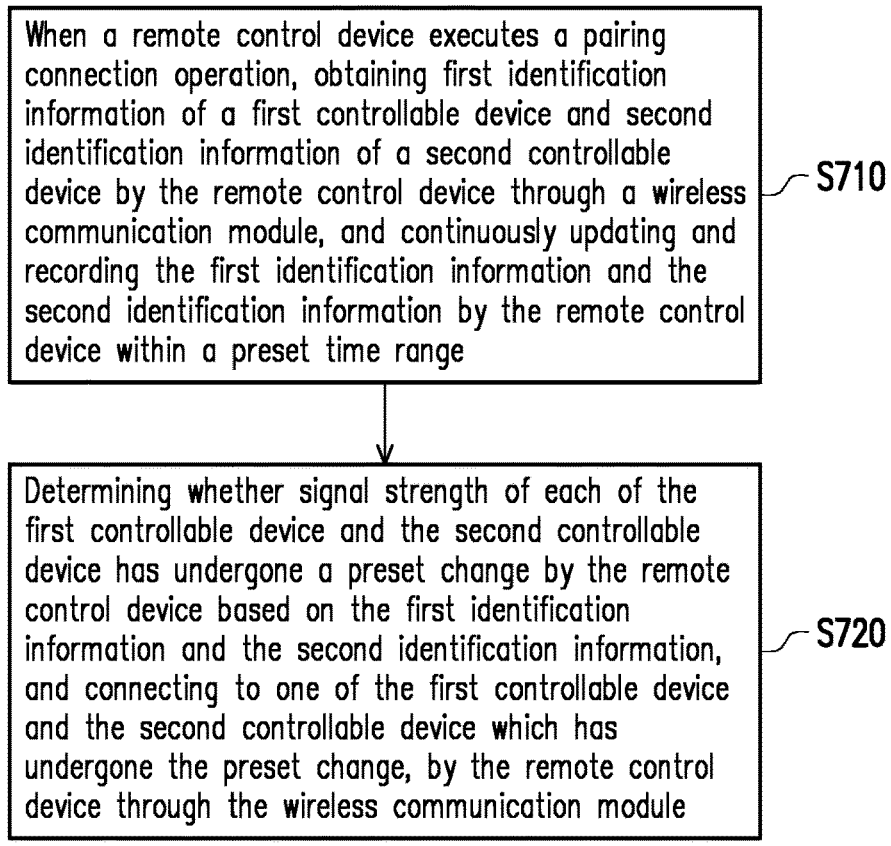
FIG. 7 illustrates a schematic diagram of a remote control method according to another embodiment of the disclosure.

FIG. 7 illustrates a schematic diagram of a remote control method according to another embodiment of the disclosure. Referring to FIG. 2 and FIG. 7, the remote control method of the present embodiment is at least applicable to the remote control system 200 of the embodiment of FIG. 2. In the present embodiment, the remote control system 200 includes the remote control device 210, the first controllable device 220 and the second controllable device 230. In step S710, when the remote control device 210 executes the pairing connection operation, the remote control device 210 obtains the first identification information of the first controllable device 220 and the second identification information of the second controllable device 230 through the wireless communication module 212, and the remote control device 210 continuously updates and records the first identification information and the second identification information within the preset time range. In step S720, the remote control device 210 determines whether the signal strength of each of the first controllable device 220 and the second controllable device 230 has undergone the preset change based on the first identification information and the second identification information, and the remote control device 210 connects to one of the first controllable device 220 and the second controllable device 230 which has undergone the preset change, through the wireless communication module 212. Therefore, the remote control device 210 of the present embodiment may choose to be paired with one of the first controllable device 220 and the second controllable device 230 based on a determination result of the signal strength of the first controllable device 220 and the second controllable device 230.

In addition, sufficient teaching, suggestions and descriptions for implementation regarding other device features and implementation manners of the remote control device 210, the first controllable device 220 and the second controllable device 230 of the present embodiment may be obtained from the embodiments of FIG. 1 to FIG. 6, and thus, details thereof are not repeated hereinafter.

In summary, in the remote control system and the remote control method of the disclosure, whether the signal strength of each of one to a plurality of controllable devices has undergone a preset change is determined by the remote control device, so as to decide whether the remote control device should connect to a specific controllable device. Said preset change may be determined based on a signal strength change or a distance parameter corresponding to signal strength. Therefore, the remote control system of the disclosure can accurately pair the remote control device with a specific controllable device to provide convenient pairing connection effects.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A remote control system comprising:
a remote control device having a wireless communication module, the remote control device being configured to execute a pairing connection operation; and
a first controllable device having a wireless communication function, and being configured to transmit first identification information to the remote control device, wherein the first identification information includes a unique identifier of the first controllable device and a received signal strength indication (RSSI) of the first controllable device,
wherein when the remote control device executes the pairing connection operation, the remote control device identifies the first controllable device by receiving the unique identifier of the first controllable device, and the remote control device continuously updates and records the RSSI of the first controllable device within a preset time range so as to determines whether the first controllable device has been displaced based on the RSSI of the first controllable device,
wherein when the RSSI of the first controllable device indicates that wireless signals received by the first controllable device has a signal strength change within the preset time range, the remote control device determines that the first controllable device has been displaced, and the remote control device connects to the first controllable device through the wireless communication module.

2. The remote control system of claim 1, wherein the remote control device determines whether the signal strength change has been in a continuously changing state within the preset time range based on the RSSI of the first controllable device, so as to connect to the first controllable device through the wireless communication module.

3. The remote control system of claim 1, wherein the remote control device determines whether a signal strength of the first controllable device has changed to become at least one of higher than a first threshold value and lower than a second threshold value within the preset time range based on the RSSI of the first controllable device, so as to connect to the first controllable device through the wireless communication module.

4. The remote control system of claim 1, further comprising:
a second controllable device having the wireless communication function, and being configured to transmit second identification information to the remote control device, wherein the second identification information includes a RSSI of the second controllable device,
wherein when the remote control device executes the pairing connection operation, the remote control device continuously updates and records the first identification information and the second identification information within the preset time range through the wireless communication module,
wherein the remote control device determines which one of the first controllable device and the second controllable device has received wireless signals with the signal strength change within the preset time range based on the first identification information and the second identification information, and the remote control device connects to one of the first controllable device and the second controllable device which has received wireless signals with the signal strength change, through the wireless communication module.

5. The remote control system of claim 4, wherein the remote control device determines whether a signal strength of each of the first controllable device and the second controllable device has been in a continuously changing state within the preset time range based on the first identification information and the second identification information, so as to select one of the first controllable device and the second controllable device, and the remote control device connects to one of the first controllable device and the second controllable device through the wireless communication module.

6. The remote control system of claim 4, wherein the remote control device determines a signal strength of each of the first controllable device and the second controllable device based on the first identification information and the second identification information, and the remote control device determines a first distance parameter and a second distance parameter based on the signal strength of each of the first controllable device and the second controllable device,
wherein the remote control device selects and connects to one of the first controllable device and the second controllable device based on the first distance parameter and the second distance parameter.

7. The remote control system of claim 4, wherein the second identification information further comprises a unique identifier of the second controllable device.

8. The remote control system of claim 1, wherein the wireless communication module is a Bluetooth module, and the wireless communication function is a Bluetooth communication function.

9. The remote control system of claim 1, wherein the first controllable device is a remote control robot.

10. A remote control method adapted to a remote control system, the remote control system comprising a remote control device and a first controllable device, wherein the remote control method comprises:
when the remote control device executes a pairing connection operation, obtaining first identification information of the first controllable device by the remote control device through a wireless communication module, wherein the first identification information includes a unique identifier of the first controllable device and a received signal strength indication (RSSI) of the first controllable device;
identifying the first controllable device by receiving the unique identifier of the first controllable device;
continuously updating and recording the RSSI of the first controllable device so as to determine whether the first controllable device has been displaced based on the RSSI of the first controllable device within the preset time range;
when the RSSI of the first controllable device indicates that wireless signals received by the first controllable device has a signal strength change within the preset time range, the remote control device determines that the first controllable device has been displaced; and
when determining that the first controllable device has been displaced, connecting to the first controllable device by the remote control device through the wireless communication module.

11. The remote control method of claim 10, wherein the step of determining whether the first controllable device has been displaced based on the RSSI of the first controllable device comprises:
determining whether the signal strength change has been in a continuously changing state within the preset time range by the remote control device based on the RSSI of the first controllable device.

12. The remote control method of claim 10, wherein the step of determining whether the first controllable device has been displaced based on the RSSI of the first controllable device comprises:
determining whether a signal strength of the first controllable device has changed to become at least one of higher than a first threshold value and lower than a second threshold value within the preset time range by the remote control device based on the RSSI of the first controllable device, so as to connect to the first controllable device through the wireless communication module.

13. The remote control method of claim 10, wherein the remote control system further comprises a second controllable device, and the remote control method further comprises:
when the remote control device executes the pairing connection operation, obtaining second identification information of the second controllable device by the remote control device through the wireless communication module, and continuously updating and recording the second identification information by the remote control device within the preset time range, wherein the second identification information includes a RSSI of the second controllable device; and
determining which one of the first controllable device and the second controllable device has received wireless signals with the signal strength change within the preset time range by the remote control device based on the first identification information and the second identification information, and connecting to one of the first controllable device and the second controllable device which has received wireless signals with the signal strength change by the remote control device through the wireless communication module.

14. The remote control method of claim 13, wherein the step of determining which one of the first controllable device and the second controllable device has received wireless signals with the signal strength change within the preset time range by the remote control device based on the first identification information and the second identification information, and connecting to one of the first controllable device and the second controllable device which has received wireless signals with the signal strength change by the remote control device through the wireless communication module comprises:
determining whether a signal strength of each of the first controllable device and the second controllable device has been in a continuously changing state within the preset time range by the remote control device based on the first identification information and the second identification information, so as to select one of the first controllable device and the second controllable device; and connecting one of the first controllable device and the second controllable device by the remote control device through the wireless communication module.

15. The remote control method of claim 13, wherein the step of determining which one of the first controllable device and the second controllable device has received wireless signals with the signal strength change within the preset time range by the remote control device based on the first identification information and the second identification information, and connecting to one of the first controllable device and the second controllable device which has received wireless signals with the signal strength change by the remote control device through the wireless communication module comprises:

determining a signal strength of each of the first controllable device and the second controllable device by the remote control device based on the first identification information and the second identification information, and determining a first distance parameter and a second distance parameter by the remote control device based on the signal strength of each of the first controllable device and the second controllable device; and selecting and connecting to one of the first controllable device and the second controllable device by the remote control device based on the first distance parameter and the second distance parameter.

* * * * *